United States Patent
Yamashita et al.

(10) Patent No.: US 9,243,384 B2
(45) Date of Patent: Jan. 26, 2016

(54) HYBRID CONSTRUCTION MACHINE

(71) Applicant: KOBELCO CONSTRUCTION MACHINERY CO., LTD., Hiroshima-shi (JP)

(72) Inventors: Koji Yamashita, Hiroshima (JP); Koji Ueda, Hiroshima (JP); Mitsunori Hirozawa, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/310,279

(22) Filed: Jun. 20, 2014

(65) Prior Publication Data

US 2015/0025726 A1  Jan. 22, 2015

(30) Foreign Application Priority Data

Jul. 18, 2013 (JP) .................................. 2013-149198

(51) Int. Cl.
| | |
|---|---|
| B60L 9/00 | (2006.01) |
| E02F 9/20 | (2006.01) |
| B60K 6/46 | (2007.10) |
| B60L 1/00 | (2006.01) |
| B60W 10/08 | (2006.01) |
| B60W 20/00 | (2006.01) |
| B60W 10/26 | (2006.01) |
| F15B 21/14 | (2006.01) |

(52) U.S. Cl.
CPC ................ *E02F 9/2091* (2013.01); *B60K 6/46* (2013.01); *B60L 1/20* (2013.01); *B60W 10/08* (2013.01);
(Continued)

(58) Field of Classification Search
CPC ................ B60W 10/08; B60W 20/00; B60W 2510/244; E02F 9/2025; E02F 9/2075; E02F 9/2217; E02F 9/2091; F02D 29/04; F02D 29/06; B60K 6/48; B60K 6/46; Y02T 10/6221; B60L 1/20; Y10S 903/907

USPC ................ 701/22, 50; 180/65.285, 65.29; 903/903, 907
See application file for complete search history.

(56) References Cited

U.S. PATENT DOCUMENTS

| | | | |
|---|---|---|---|
| 6,789,335 B1 | 9/2004 | Kinugawa et al. | |
| 7,525,206 B2 * | 4/2009 | Kagoshima et al. | ........ 290/40 C |

(Continued)

FOREIGN PATENT DOCUMENTS

| | | |
|---|---|---|
| EP | 1 834 854 A2 | 9/2007 |
| EP | 1 834 854 A3 | 9/2007 |

(Continued)

OTHER PUBLICATIONS

Extended European Search Report issued Dec. 16, 2014 in Patent Application No. 14174942.4.

*Primary Examiner* — Gertrude Arthur Jeanglaude

(74) *Attorney, Agent, or Firm* — Oblon, McClelland, Maier & Neustadt, L.L.P.

(57) ABSTRACT

Provided is a hybrid construction machine preventing an electrical storage device from overcharge, including a hydraulic actuator, a hydraulic pump, a generator-motor which performs electric generator and motor actions, an engine, an electric actuator which generates regenerative electric power, an electrical storage device which performs a charge-and-discharge action with the generator-motor and the electric actuator, a charge-rate detector which detects a charge rate $C_1$ of the electrical storage device, and a control section which controls an operation of the generator-motor and a charge-and-discharge action of the electrical storage device. The control section, when the charge rate $C_1$ exceeds a set value $C_s$, performs overcharge-prevention control of making assist power by the electric motor action of the generator-motor be greater than that when $C_1 \leq C_s$, the set value $C_s$ predetermined as a charge rate at which receiving the regenerative electric power can overcharge the electrical storage device.

7 Claims, 3 Drawing Sheets

(52) U.S. Cl.
CPC ............. *B60W 10/26* (2013.01); *B60W 20/106* (2013.01); *E02F 9/2075* (2013.01); *F15B 21/14* (2013.01); *B60W 2510/244* (2013.01); *F15B 2211/20515* (2013.01); *F15B 2211/20523* (2013.01); *F15B 2211/20569* (2013.01); *F15B 2211/88* (2013.01); *Y10S 903/907* (2013.01)

(56) References Cited

U.S. PATENT DOCUMENTS

| | | | |
|---|---|---|---|
| 8,606,448 B2 * | 12/2013 | Anders et al. | 701/22 |
| 2007/0214782 A1 | 9/2007 | Komiyama et al. | |
| 2008/0093864 A1 * | 4/2008 | Kagoshima et al. | 290/40 A |
| 2012/0144819 A1 | 6/2012 | Kawashima et al. | |
| 2012/0303227 A1 * | 11/2012 | Nakamura | 701/50 |
| 2013/0174556 A1 | 7/2013 | Nishikawa et al. | |

FOREIGN PATENT DOCUMENTS

| | | |
|---|---|---|
| EP | 2 463 137 A2 | 6/2012 |
| EP | 2 463 137 A3 | 6/2012 |
| EP | 2 597 207 A1 | 5/2013 |
| JP | 2000-283107 | 10/2000 |
| JP | 2007-247230 | 9/2007 |

\* cited by examiner

HYBRID CONSTRUCTION MACHINE

BACKGROUND OF THE INVENTION

1. Field of the Invention

The present invention relates to a hybrid construction machine which uses both engine power and electric power stored by an electrical storage device.

2. Description of the Related Art

A background art of the present invention will be described based on an example of an excavator with reference to FIG. 5.

The excavator includes a crawler-type lower traveling body 1, an upper slewing body 2 mounted on the lower traveling body 1 slewably around an axis X perpendicular to a ground surface, a front attachment 3 attached to the upper slewing body 2 for an excavation operation, and an engine. The front attachment 3 has a boom 4 capable of being raised and lowered, an arm 5 connected to a front end of the boom 4, a bucket 6 connected to a front end of the arm 5, and a plurality of hydraulic actuators for driving the boom 4, the arm 5, and the bucket 6, namely, a boom cylinder 7, an arm cylinder 8 and a bucket cylinder 9.

In addition, described in Japanese Patent Application Laid-open No. 2000-283107 and Japanese Patent Application Laid-open No. 2007-247230 are hybrid excavators, each of which further includes: a hydraulic pump for driving the hydraulic actuators, a generator-motor which performs an electric generator action and an electric motor action, and an electrical storage device. The hydraulic pump and the generator-motor are connected to the engine. The generator-motor charges the electrical storage device by the electric generator action, and on the other hand, timely driven by use of electric power stored in the electrical storage device to perform the electric motor action, thereby assisting the engine.

Furthermore, there is a hybrid excavator further including an electric actuator, which is actuated by use of the electrical storage device as an electric power source, such as a slewing electric motor as a slewing driving source of the upper slewing body 2, an electric cylinder which actuates the front attachment 3, or the like. Such an electric actuator is able to make a regeneration operation. The electric actuator, if being, for example, a slewing electric motor, generates regenerative electric power involving a slewing deceleration operation. The generated regenerative electric power is stored in the electrical storage device. This charge action of the electrical storage device causes a regeneration brake.

This type of hybrid excavator, however, has a possibility of overcharge of the electrical storage device in excess of a proper charge rate due to recovery of the regenerative electric power, in the case where the electrical storage device has a high charge rate when recovering the electric power, and the overcharge can involve a failure and life shortening of the electrical storage device. The overcharge may be prevented by providing a regenerative resistor to consume the regenerative electric power of the electric actuators; however, this requires addition of further facilities separately from the regenerative register, namely, a relatively large regenerative resistor, a control device for the regenerative resistor, and a further facility for treating heat generated by the regenerative resistor. This makes devices be difficultly arranged in the excavator with a severe space limit and involves substantially increased cost.

SUMMARY OF THE INVENTION

An object of the present invention is to provide a hybrid construction machine including an electric actuator and an electrical storage device which stores regenerative electric power generated by the electric actuator, the hybrid construction machine being capable of preventing the electrical storage device from being overcharged.

Provided by the present invention is a hybrid construction machine including: a hydraulic actuator; a hydraulic pump as a hydraulic power source of the hydraulic actuator; a generator-motor which performs an electric generator action and an electric motor action; an engine serving as a power source of the hydraulic pump and the generator-motor, the engine connected to the generator-motor so as to be assisted by the generator-motor performing the electric motor action; an electric actuator which generates regenerative electric power; an electrical storage device which performs a charge-and-discharge action of making supply and receive of electric power with the generator-motor and the electric actuator; a charge rate detector which detects a charge rate C1 of the electrical storage device; and a control section which controls an operation of the generator-motor and the charge-and-discharge action of the electrical storage device. The control section, when the charge rate C1 detected by the charge rate detector is greater than a value Cs predetermined as a value of a charge rate at which the electrical storage device can be overcharged by receiving the regenerative electric power generated by the electric actuator, performs overcharge-prevention control of making assist power by the electric motor action of the generator-motor be greater than that in the case of $C1 \leq Cs$.

DESCRIPTION OF THE PREFERRED EMBODIMENT

Figure 5:
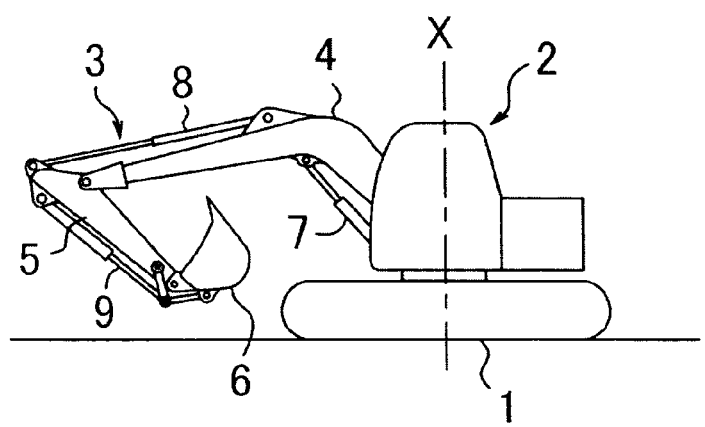
FIG. 5 is a schematic side view of a hybrid excavator.

An embodiment of the present invention will be described with reference to the drawings. The embodiment described below is based on an example where the present invention is applied to a hybrid excavator shown in FIG. 5, specifically, an example of providing a slewing electric motor, which is a slewing driving source, as an electric actuator.

Figure 1:
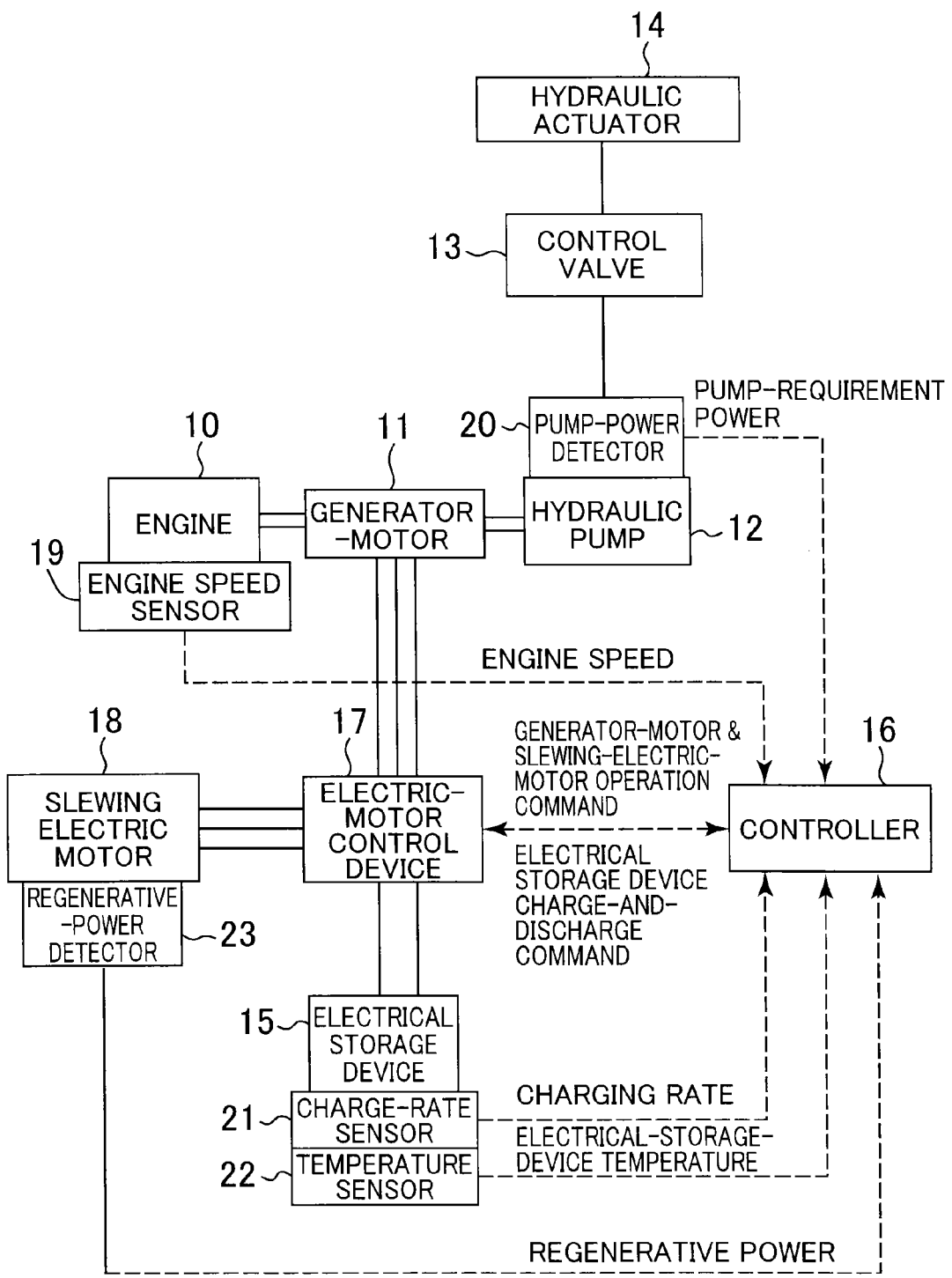
FIG. 1 is a system configuration diagram of a hybrid excavator according to an embodiment of the present invention.

The hybrid excavator according to the present embodiment includes, as shown in FIG. 1, an engine 10, a generator-motor 11, a hydraulic pump 12, a control valve 13, a hydraulic actuator 14, an electrical storage device 15, a controller 16, an electric-motor control device 17, and a slewing electric motor 18.

The engine 10 is a power source for the generator-motor 11 and the hydraulic pump 12. The generator-motor 11 performs an electric generator action and an electric motor action. The hydraulic pump 12 is a hydraulic power source for the hydraulic actuator 14. The generator-motor 11 and the hydraulic pump 12 are connected to the engine 10 to be driven by the engine 10.

The hydraulic actuator 14 is a generic symbol covering the boom cylinder 7 and other hydraulic actuators shown in FIG.

5. The hydraulic actuator 14 is connected to the hydraulic pump 12 via the control valve 13 to be driven by a pressure hydraulic fluid supplied from the hydraulic pump 12.

The generator-motor 11 is driven by the engine 10 to perform an electric generator action, thereby generating electric power. The generated electric power is transmitted to the electrical storage device 15 to be stored in the electrical storage device 15. The electric power thus contributes to electric charge of the electrical storage device 15. Meanwhile, the generator-motor 11 timely performs an electric motor action by use of the electric power of the electrical storage device 15 to assist the engine 10.

To the generator-motor 11, the slewing electric motor 18 and the electrical storage device 15 are connected via the electric-motor control device 17. The electric-motor control device 17 and the controller 16 constitute a control section according to the present invention. The slewing electric motor 18 is driven by the electric power stored in the electrical storage device 15 to thereby slew the upper slewing body 2 shown in FIG. 5. The slewing electric motor 18 also generates during a slewing deceleration, the regenerative power being timely supplied to the electrical storage device 15 to charge the electrical storage device 15.

The electric-motor control device 17 controls mutual supply and receive of electric power among the generator-motor 11, the slewing electric motor 18, and the electrical storage device 15. Specifically, the electric-motor control device 17 controls electric charge and discharge with respect to the electrical storage device 15 and respective operations of the generator-motor 11 and the slewing electric motor 18.

The hybrid excavator further includes, as detection means: an engine speed sensor 19 which detects an engine speed; a pump-requirement power detector 20 which detects pump-requirement power from a pressure and a flow rate of the hydraulic pump 12, the pump-requirement power being one which the hydraulic pump 12 requires; a charge-rate sensor 21 as a charge rate detector which detects a charge rate of the electrical storage device 15; a temperature sensor 22 as a temperature detector which detects a temperature of the electrical storage device 15; and a regenerative-power detector 23 which detects regenerative power corresponding to a slewing speed of the slewing electric motor 18, that is, regenerative electric power generated during deceleration at the slewing speed. These detection means generate respective signals on the engine speed, the pump-requirement power, the charge rate, the temperature of the electrical storage device, and the regenerative power, and input the signals to the controller 16.

The controller 16 stores the following predetermined characteristics and the like.

Figure 3:
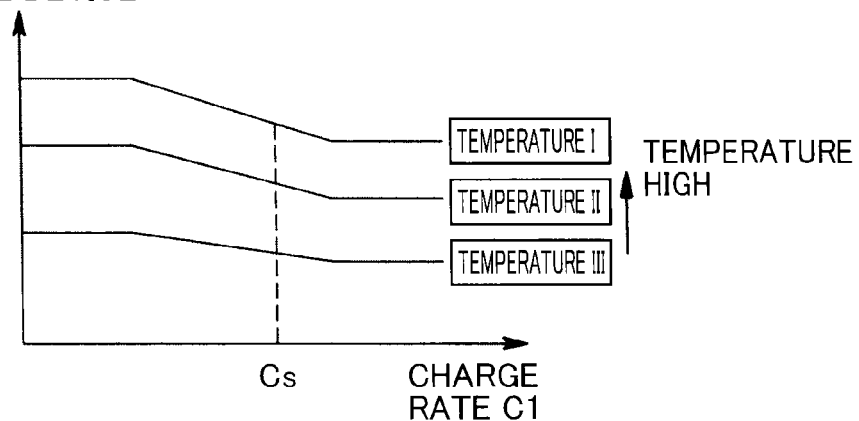
FIG. 3 is a diagram showing a relationship between a charge rate and electrically chargeable power of an electrical storage device in the hybrid excavator.

(a) A Relationship Between a Charge Rate Corresponding to a Temperature of the Electrical Storage Device 15 and Electrically Chargeable Power The power F which can be stored in the electrical storage device 15, in other words, the power which the electrical storage device 15 can receive from outside within a range not exceeding a proper charge rate, namely, available capacity for electric charge, is increased with a decrease in the charge rate at an electric-charge start time, as shown in FIG. 3. Besides, at the same charge rate, the electrically chargeable power F is increased with an increase in the temperature of the electrical storage device 15. In view of this, the characteristic shown in FIG. 3 is set in advance and stored in the controller 16. Based on the characteristic, the controller 16 calculates the electrically chargeable power F from a detected charge rate C1 and a temperature.

(b) A Relationship Between an Engine Speed and Engine Total Power

Figure 4:
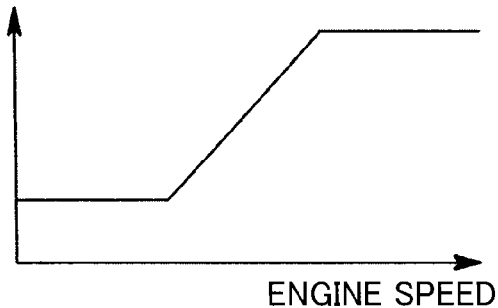
FIG. 4 is a diagram showing a relationship between an engine speed and engine total power in the hybrid excavator.

Engine total power B required for rotating the engine 10 is equal to a sum of power for driving an engine body and co-rotation power of engine accessory parts other than the hydraulic pump 12, such as a fan, an engine piston, and a crank shaft. The engine total power B varies according to an engine speed as shown in FIG. 4, specifically, is increased with an increase in the engine speed. In view of this, the relationship between the engine speed and the engine total power B shown in FIG. 4 is set in advance and stored in the controller 16. Based on the characteristic, the controller 16 obtains the engine total power B from a detected engine speed.

(c) A Charge Rate

Charging the electrical storage device 15 by regenerative electric power of the slewing electric motor 18 when the electrical storage device 15 has a high charge rate, namely, overcharge of the electrical storage device 15, has a possibility of involving a failure and life shortening of the electrical storage device 15. In view of this, concerning the regenerative power of the slewing electric motor 18, the set value Cs of a charge rate as shown in FIG. 3 is set in advance and stored in the controller 16: the set value Cs is a value of the charge rate corresponding to the electric power which can bring the electrical storage device 15 into overcharge when received by the electrical storage device 15. Specifically, the set value Cs is set to, for example, a value slightly lower than an upper limit of a proper charge rate, with a constant width.

The controller 16 storing the above information performs: obtaining the electrically chargeable power F as the available capacity for electric charge, from the detected charge rate C1, based on the characteristic of (a); judging whether the charge rate C1 is lower than the set value Cs; determining assist power of the generator-motor 11 based on the judgment; and making the generator-motor 11 output the assist power.

Figure 2:
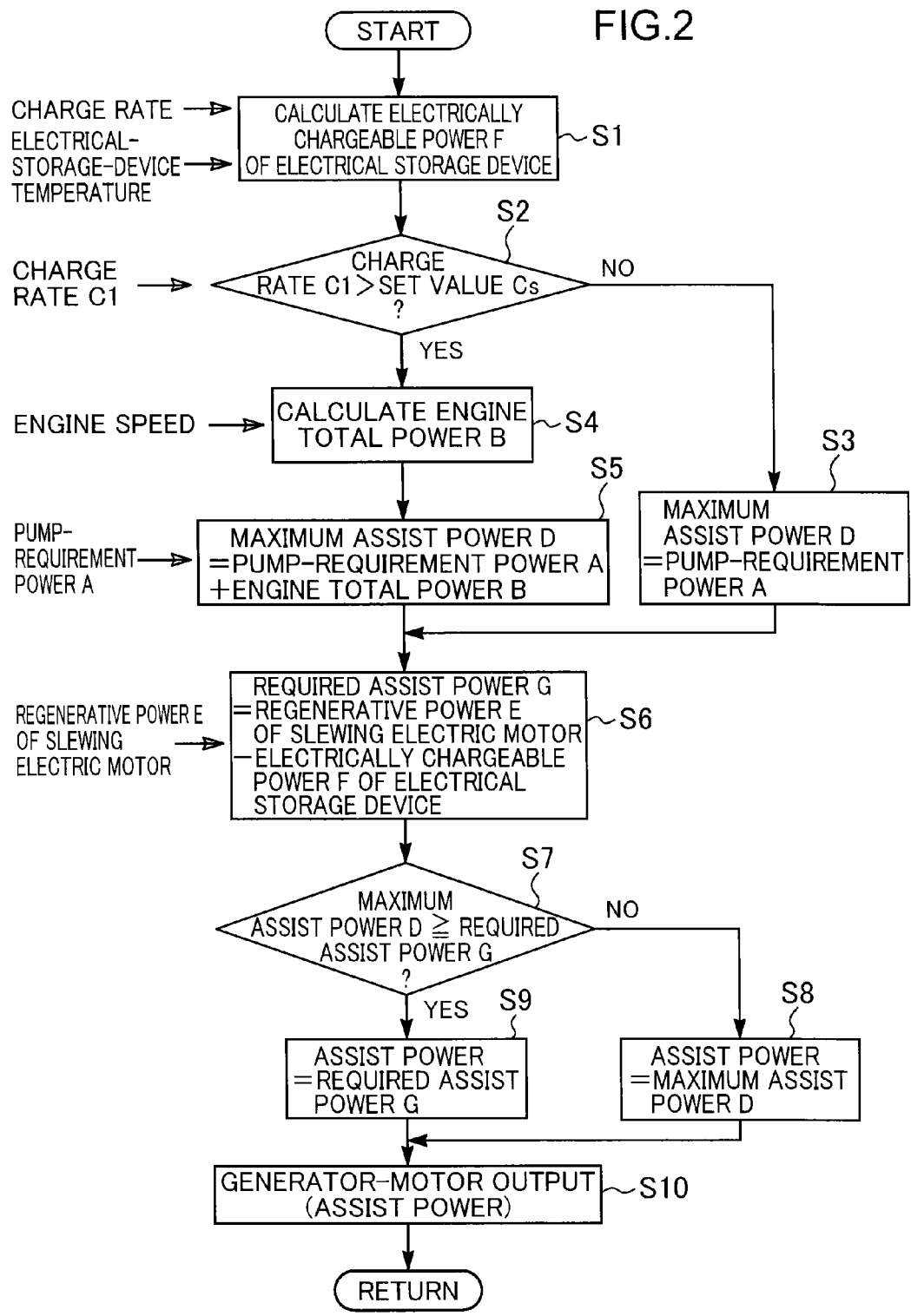
FIG. 2 is a flowchart for explaining main control operations performed by the hybrid excavator.

The detail of the control performed by the controller 16 will be described based on the flowchart of FIG. 2.

Upon start of the control, the controller 16, in Step S1, calculates the electrically chargeable power F of the electrical storage device 15 based on the characteristic shown in FIG. 3, from the detected charge rate C1 of the electrical storage device 15 and the temperature. Although FIG. 3 shows only three kinds of electrical-storage device temperatures I, II, and III, the electrical-storage device temperatures may be set in more detail. Alternatively, interpolation is allowed to be made for obtaining the electrically chargeable power F corresponding to a temperature between the temperatures I and II and a temperature between the temperatures II and III.

In Step S2, the controller 16 judges whether the detected charge rate C1 is higher than the set value Cs. When C1≤Cs (NO in Step S2), the controller 16 sets maximum assist power D, which is a maximum value of the assist power by the generator-motor 11, to pump-requirement power A, in Step S3. In short, the controller 16 sets the maximum assist power D such that D=A. On contrary, when C1>Cs (YES in Step S2), the controller 16 calculates engine total power B based on the characteristic shown in FIG. 4 from the detected engine speed, in Step S4, and sets the maximum assist power D to a sum of the pump-requirement power A and the engine total power B, in Step S5. In short, the controller 16 sets the maximum assist power D such that D=A+B.

In step S6, the controller 16 obtains required assist power G, which is electrical-storage device electric power to be consumed as assist power of the generator-motor 11 in order to prevent overcharge, based on the following equation, from the electrically chargeable power F obtained in Step S1, and regenerative power E generated in the slewing electric motor 18: the regenerative power E is determined by the slewing speed and become equal to 0 when slewing is stopped.

The required assist power G=the regenerative power E−the electrically chargeable power F According to this equation, the required assist power G during a slewing-stop period becomes minus because the regenerative power E is equal to zero.

In Step S7, the controller 16 judges whether the maximum assist power D is greater than the required assist power G. When D<G, that is, in the case of NO in Step S7, the controller 16 sets actual assist power H to the maximum assist power D in Step S8. In short, the controller 16 sets the actual assist power H such that H=D. On contrary, when D≥G, that is, in the case of YES in Step S7, the controller 16 sets the actual assist power H to the required assist power G in Step S9. In short, the controller 16 sets the actual assist power H such that H=G.

In Step S10, the controller 16 provides a command of the maximum assist power D or the required assist power G as the actual assist power H, that is, a generator-motor output, based on a result of processing in Step S8 or Step S9. The controller 16 thereafter repeats the processing in Step S1.

The control section, performing the above control, enables the following effects to be obtained.

(1) In the state of C1>Cs where the electrical storage device 15 has a risk of being overcharged, the control section sets assist power of the generator-motor 11 to one greater than assist power when C1≤Cs, thus allowing the electric power discharged by the electrical storage device 15 to be increased to reduce the charge rate thereof and thereby preventing the electrical storage device 15 from being overcharged due to receive of the regenerative power generated by the slewing electric motor 18.

(2) When C1>Cs, the control section makes the maximum assist power D=the pump-requirement power A+the engine total power B, thus not only securely preventing the electrical storage device 15 from being overcharged but also bringing a fuel injection quantity of the engine 10 close to zero to thereby enable energy saving effect to be obtained.

(3) When C1≤Cs, which involves no risk of overcharge, the control section makes the generator-motor 11 assist the engine 10 by the pump-requirement power A, thereby allowing proper charge-and-discharge action of the electrical storage device 15 to be secured.

(4) The control section, calculating the electrically chargeable power F from the temperature of the electrical storage device 15 and the charge rate C1 detected respectively by the charge rate sensor 21 and the temperature sensor 22, can obtain accurate electrically chargeable power of the electrical storage device 15.

The present invention is not limited to the above embodiment. For example, the overcharge-prevention control, which is also performed during a slewing-stop period in the embodiment, may be performed during only the slewing deceleration, because actual overcharge is likely to occur when regenerative power is produced by slewing deceleration. Besides, while the embodiment presents the hybrid excavator including the slewing electric motor 18 as the electric actuator, the present invention can be similarly applied to a hybrid excavator including an electric cylinder for actuating a front attachment, in addition to or in place of the slewing electric motor 18, or a hybrid construction machine other than the excavator.

As described above, the present invention provides a hybrid construction machine including an electric actuator and an electrical storage device which stores regenerative electric power generated by the electric actuator, the hybrid construction machine being capable of preventing the electrical storage device from being overcharged.

Provided by the present invention is a hybrid construction machine including: a hydraulic actuator; a hydraulic pump as a hydraulic power source of the hydraulic actuator; a generator-motor which performs an electric generator action and an electric motor action; an engine serving as a power source of the hydraulic pump and the generator-motor, the engine connected to the generator-motor so as to be assisted by the generator-motor performing the electric motor action; an electric actuator which generates regenerative electric power; an electrical storage device which performs a charge-and-discharge action of making supply and receive of electric power with the generator-motor and the electric actuator; a charge rate detector which detects a charge rate C1 of the electrical storage device; and a control section which controls an operation of the generator-motor and the charge-and-discharge action of the electrical storage device. The control section, when the charge rate C1 detected by the charge rate detector is greater than a value Cs predetermined as a value of a charge rate at which the electrical storage device can be overcharged by receiving the regenerative electric power generated by the electric actuator, performs overcharge-prevention control of making assist power by the electric motor action of the generator-motor be greater than that in the case of C1≤Cs.

The control section of the hybrid construction machine, which sets assist power of the generator-motor to be one greater than assist power when C1≤Cs, in the state of C1>Cs with a risk of overcharge of the electrical storage device, increases the electric power discharged by the electrical storage device, thereby reducing the charge rate to prevent the electrical storage device from being overcharged due to receive of the regenerative power.

Preferably, the control section performs the overcharge-prevention control by setting maximum assist power D, which is a maximum value of power by which the generator-motor can assist the engine.

In this case, it is preferable that the control section performs the overcharge prevention control by setting the maximum assist power so that D=(A+B) is satisfied when C1>Cs, wherein A represents pump-requirement power obtained from a pressure and a flow rate of the hydraulic pump, and B represents engine total power which is a sum of power for driving a body of the engine and co-rotation power required to drive engine accessory parts excluding the hydraulic pump. This control makes it possible not only to prevent the electrical storage device from being overcharged securely but also to bring a fuel injection quantity of the engine close to zero to thereby obtain the energy saving effect.

Besides, the control section preferably sets the maximum assist power so that D=A is satisfied when C1≤Cs, wherein A represents pump-requirement power obtained from a pressure and a flow rate of the hydraulic pump. Thus making the generator-motor assist the engine by the pump-requirement power A in the state of no risk of the overcharge allows a proper charge-and-discharge action to be secured.

On the other hand, the control section preferably performs: obtaining the required assist power such that G=(E−F) is satisfied; setting the required assist power to the assist power of the generator-motor when D≥G; and setting the maximum assist power to the assist power of the generator-motor when D<G, where E represents regenerative power generated by the electric actuator, F represents electrically chargeable power as available capacity for electric charging obtained from a charge rate of the electrical storage device, and G represents required assist power as electrical-storage device electric power to be consumed as assist power of the generator-motor. This control makes it possible to prevent energy from being wasted due to consumption of power more than required assist power.

In this case, preferably, the hybrid construction machine according to the present invention further includes a temperature detector which detects a temperature of the electrical storage device, and the control section obtains the electrically chargeable power F from the detected charge rate $C_1$ and the detected electrical-storage device temperature. Thus taking account of the electrical-storage device temperature allows the electrically chargeable power to be more accurately obtained, because the electrically chargeable power of the electrical storage device is dependent not only from the charge rate but also from the temperature of the electrical-storage device.

This application is based on Japanese Patent application No. 2013-149198 filed in Japan Patent Office on Jul. 18, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claim is:

1. A hybrid construction machine comprising:
   a hydraulic actuator;
   a hydraulic pump which provides hydraulic power to the hydraulic actuator;
   a generator-motor which performs an electric generator action for generating electric power and an electric motor action for providing assist power to assist the engine;
   an engine which provides driving power to the hydraulic pump and the generator-motor, the engine connected to the generator-motor to receive the assist power from the generator-motor;
   an electric actuator which generates regenerative electric power;
   an electrical storage device which performs a charge-and-discharge action of supplying and receiving electric power to and from the generator-motor and the electric actuator;
   a charge rate detector which detects a charge rate $C_1$ of the electrical storage device; and
   a control section which controls an operation of the generator-motor and the charge-and-discharge action of the electrical storage device, wherein
   when the charge rate $C_1$ detected by the charge rate detector is greater than a predetermined charge rate $C_s$ at which the electrical storage device is likely to be overcharged by receiving the regenerative electric power generated by the electric actuator, the control section performs overcharge-prevention control of making the assist power greater than that when $C_1 \leq C_s$.

2. The hybrid construction machine according to claim 1, wherein the overcharge-prevention control includes setting a maximum assist power D, which is a maximum power by which the generator-motor can assist.

3. The hybrid construction machine according to claim 2, wherein the maximum assist power D is set as $D=(A+B)$ when $C_1 > C_s$, where A represents a pump-requirement power obtained from a pressure and a flow rate of the hydraulic pump, and B represents a total power for the engine which is a sum of a power required to drive a main body of the engine and a power required to co-rotationally drive accessory parts of the engine, the accessory parts excluding the hydraulic pump.

4. The hybrid construction machine according to claim 2, wherein the maximum assist power D is set as $D=A$ when $C_1 \leq C_s$, where A represents a pump-requirement power obtained from a pressure and a flow rate of the hydraulic pump.

5. The hybrid construction machine according to claim 4, wherein the maximum assist power D is set as $D=(A+B)$ when $C_1 > C_s$, where B represents a total power of the engine which is a sum of a power required to drive a main body of the engine and a power required to co-rotationally drive accessory parts of the engine, the accessory parts excluding the hydraulic pump.

6. The hybrid construction machine according to claim 2, wherein the control section obtains a required assist power G which must be consumed by the generator-motor in accordance with $G=(E-F)$, sets the obtained required assist power as the assist power of the generator-motor when $D \geq G$, and sets the maximum assist power as the assist power of the generator-motor when $D < G$, where E represents a regenerative power generated by the electric actuator, F represents an electrically chargeable power which is an available capacity of the electrical storage device and is obtained from a charge rate of the electrical storage device.

7. The hybrid construction machine according to claim 6, further comprising a temperature detector that detects a temperature of the electrical storage device, wherein the electrically chargeable power F is obtained from a detected charge rate $C_1$ and a detected electrical-storage device temperature.

* * * * *